(12) United States Patent
Oates et al.

(10) Patent No.: US 6,840,882 B2
(45) Date of Patent: Jan. 11, 2005

(54) INTER-AXLE DIFFERENTIAL ASSEMBLY FOR A TANDEM DRIVE AXLE SET

(75) Inventors: Jack Darrin Oates, Fletcher, NC (US); Michael Rossi, Hendersonville, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 185 days.

(21) Appl. No.: 10/278,298

(22) Filed: Oct. 23, 2002

(65) Prior Publication Data

US 2004/0079562 A1 Apr. 29, 2004

(51) Int. Cl.$^7$ .............................................. F16H 48/06
(52) U.S. Cl. ...................................... 475/221; 475/222
(58) Field of Search ................................ 475/221, 222; 180/24.09

(56) References Cited

U.S. PATENT DOCUMENTS

| | | | |
|---|---|---|---|
| RE25,269 E | | 10/1962 | Christie |
| 3,532,183 A | * | 10/1970 | Shealy .......................... 184/10 |
| 3,887,037 A | * | 6/1975 | Haluda et al. .............. 184/6.12 |
| 4,050,534 A | | 9/1977 | Nelson et al. |
| 5,860,889 A | | 1/1999 | Schlosser et al. |
| 6,200,240 B1 | | 3/2001 | Oates |
| 6,648,788 B1 | * | 11/2003 | Sullivan ...................... 475/221 |

OTHER PUBLICATIONS

Interwheel Differential Drive Differentials of Wheeled Vehicles, Moscow Mashinostroyenie, 1987, pp. 35–45.

Translation of above.

* cited by examiner

Primary Examiner—Dirk Wright
(74) Attorney, Agent, or Firm—Carlson, Gaskey & Olds

(57) ABSTRACT

An inter-axle differential assembly for a tandem drive axle set is disclosed that significantly reduces the vertical distance between input axes for a rear drive assembly and a forward drive assembly. The forward drive assembly includes a hollow pinion gear that is supported by a pair of tapered roller bearings. An inter-axle differential assembly is supported by a single tapered roller bearing and receives input from a driveline connection and transfers this input to the hollow pinion gear and to a through shaft that extends through the hollow pinion gear. The hollow pinion gear drives a main differential assembly that in turn drives a forward axle. The through shaft extends toward a rear drive assembly and provides input to the rear drive assembly. The rear drive assembly utilizes a rear pinion gear to drive a rear differential. The rear differential in turn drives a rear axle. This configuration significantly reduces the vertical distance between the input to the forward drive assembly and the input to the rear drive assembly or even allows a common axis to be shared by the inputs to the forward and rear drive assemblies.

27 Claims, 4 Drawing Sheets

INTER-AXLE DIFFERENTIAL ASSEMBLY FOR A TANDEM DRIVE AXLE SET

BACKGROUND OF THE INVENTION

This invention relates generally to a tandem drive axle set and, more particularly, to an improved bearing configuration for an inter-axle differential assembly for a tandem drive axle set.

A tandem drive axle set is used to distribute rotational power from a driveline input to a set of forward and rear wheels through a forward drive axle assembly and a rear drive axle assembly, respectively. Traditionally, the tandem drive axle set is designed such that the forward drive axle assembly has a ring gear and a pinion gear set that is a mirror image of the rear drive axle assembly ring gear and pinion gear set. Usually, the forward drive axle assembly has a right-hand pinion gear while the rear drive axle assembly has a left-hand pinion gear. It is necessary that the forward and rear drive axle assemblies be mirror images of each other because, traditionally, the forward drive axle assembly has included a set of helical gears that are used to transfer half of the rotational power from an inter-axle differential to the forward drive axle assembly pinion and ring gear set. That is, the forward and rear drives require distinct parts resulting in axle component proliferation, which is undesirable.

The inter-axle differential receives rotational input from the driveline of the vehicle. In such a design, the pinion gear of the forward drive axle assembly rotates in the opposite direction to that of the inter-axle differential. The inter-axle differential transmits the other half of its input to a through shaft, which sends the input back to the rear drive axle assembly. In the rear drive axle assembly the pinion gear rotates in the same direction as the inter-axle differential. Because the helical gears are necessary in the forward drive axle assembly, the axis of the input to the forward drive axle assembly is offset from the pinion gear axis in the forward drive axle assembly by the centerline-to-centerline distance of the helical gears. Therefore, the output of the forward drive axle assembly is on the same axis as the input while the input of the rear drive axle assembly is on the same axis as the forward drive axle pinion gear.

This difference in axis height between the forward axle output to the rear axle input requires different axle pinion angles to be utilized in order to set the driveline angles in the u-joints used in the driveline. Setting and maintaining the driveline angles is difficult. When the driveline angles at the u-joints are not the same it creates adverse torsional loading and vibrations in the drivetrain assembly. Such torsional loading and vibrations can lead to premature failure of the drivetrain assembly. Even when the driveline angles are properly set at the factory, the air-ride suspensions commonly found in heavy duty trucks can alter the driveline working angles in an adverse manner.

One solution is to utilize a hollow pinion gear in the forward drive axle assembly as described in U.S. Pat. No. 6,200,240 assigned to the assignee of the present invention. The through shaft extends from the inter-axle differential and through the hollow pinion gear. The hollow pinion gear drives the main differential in the forward drive axle assembly. The through shaft extends toward the rear drive axle assembly which utilizes a traditional pinion gear to drive a rear differential. This configuration allows a common axis to be shared by the input to the forward drive axle assembly and the input to the rear drive axle assembly, i.e. the hollow pinion gear and the rear pinion gear have a common axis.

One disadvantage with this configuration is that multiple bearings are required to support the inter-axle differential and additional bearings are required to support the hollow pinion gear. Each bearing represents a potential failure mode in the drive axle assembly. Additionally, each bearing requires a significant amount of packaging space within the drive axle assembly, which reduces available packaging space for other axle components.

Another disadvantage with the axle assembly described in U.S. Pat. No. 6,200,240 is that certain applications cannot be configured to have a common axis for the forward and rear pinions. However, it is still advantageous to reduce the vertical height difference between the forward and rear pinions as much as possible.

Thus, it is desirable to provide an improved tandem axle set configuration with fewer bearings but which still provides a common axis to be shared by the input to the forward drive axle assembly and the input to the rear drive axle assembly or which provides a significantly reduced vertical height between the pinion inputs. The improved bearing configuration should be capable of accommodating the different loading generated by the inter-axle differential during vehicle operation as well as overcoming the other above mentioned deficiencies with the prior art.

SUMMARY OF THE INVENTION

The subject invention provides a tandem axle drive set that significantly reduces the vertical distance between a forward pinion axis and a rear pinion axis. An inter-axle differential splits the driving input between the forward and rear drive axles. The inter-axle differential is operably coupled to a through shaft that extends through a hollow pinion gear in the forward drive axle. The through shaft provides driving input to the rear axle via a connecting driveshaft. The through shaft and hollow pinion gear combination permit the inputs to the forward and rear drive axles to be coaxial. In addition, the present design eliminates the traditional need for pair of bearings to support the inter-axle differential.

Preferably, the inter-axle differential includes inboard and outboard side gears. The through shaft has a first end secured to the outboard side gear and extends through the hollow pinion gear toward the rear drive axle. The inter-axle differential is solely supported by a single tapered roller bearing. In the preferred embodiment, the tapered roller bearing is positioned outboard from the outboard side gear and is directly supported between an inter-axle differential housing component and an inter-axle differential cover.

Preferably, the hollow pinion gear is solely supported by a first bearing positioned outboard from a pinion gear head and a second bearing positioned inboard from the pinion gear head. The first and second bearings are single tapered roller bearings. Thrust loading on the inboard side of the inter-axle differential is reacted by at least one of the first or second bearings, which eliminates the need for additional bearing support for the inter-axle differential.

Thus, a tandem drive axle set is provided that requires fewer bearing members and reduces vertical height distance between the input to the forward drive axle and the input to the rear drive axle. This design minimizes issues related to setting driveline angles between the forward and rear drive assemblies.

These and other features and advantages of this invention will become more apparent to those skilled in the art from the following detailed description of the presently preferred embodiment. The drawings that accompany the detailed description can be described as follows.

DETAILED DESCRIPTION OF A PREFERRED EMBODIMENT

Figure 1:
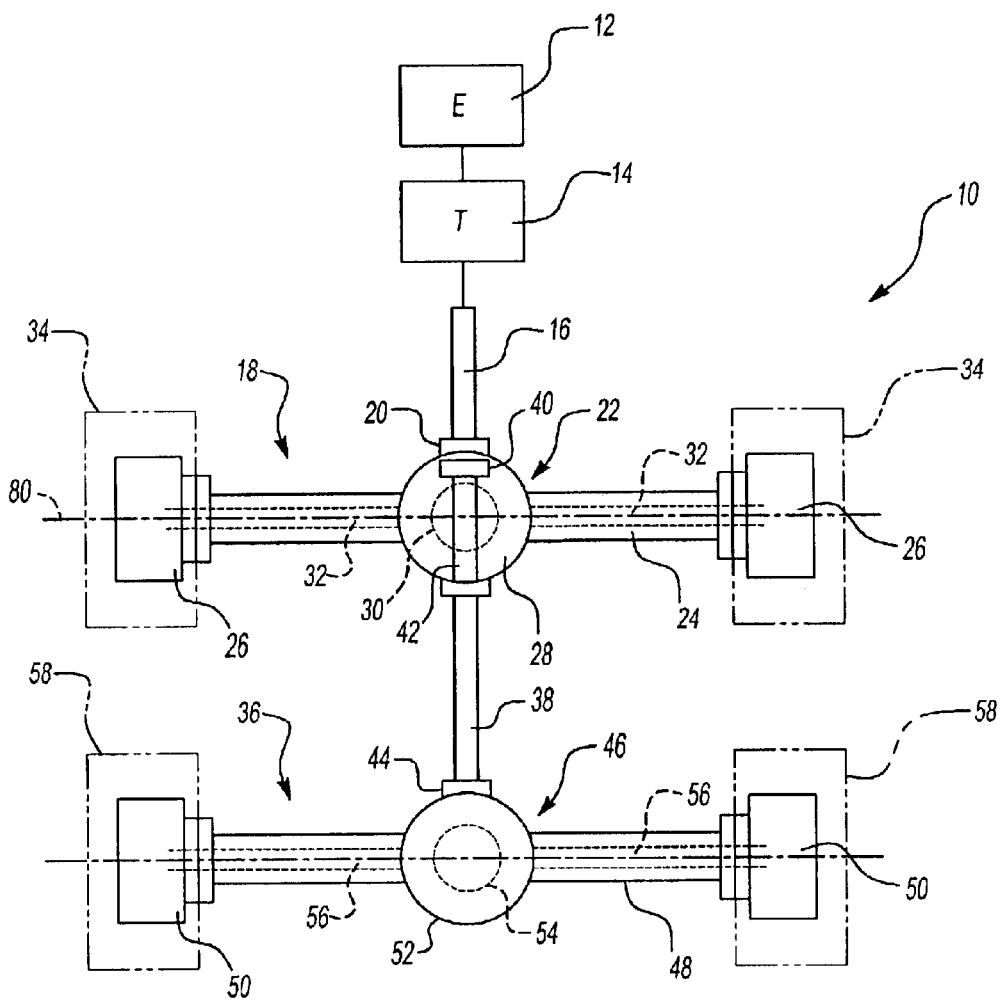
FIG. 1 is a schematic overhead view of a powertrain assembly for a tandem drive axle set.

A powertrain assembly and tandem axle set is shown generally at 10 in FIG. 1. The powertrain assembly 10 includes an engine 12 and transmission 14 that drive a driveshaft 16 as is known in the art. The driveshaft 16 is coupled to a forward drive axle 18 of a tandem axle set at an input 20. The forward drive axle 18 includes a forward carrier 22, axle housing 24, and a pair of laterally spaced wheel ends 26 positioned on opposing ends of the axle housing. 24. The forward carrier 22 includes a carrier housing 28 and forward differential assembly 30 that is operably coupled to drive a pair of axle shafts 32. The axle shafts 32 drive the wheel ends 26, which support tires 34 as is known in the art.

The tandem axle set also includes a rear drive axle 36 that is coupled to the forward drive axle 18 with a connecting driveshaft 38. An inter-axle differential (IAD) 40, located in the forward carrier 22, splits driving power supplied at the input 20 between the forward 18 and rear 36 drive axles. The IAD assembly 40 drives the forward differential assembly 30 in the forward drive axle 18 and transfers driving power to the connecting driveshaft 38 for the rear drive axle 36 via a through shaft 42. The connecting driveshaft 38 is coupled to the rear drive axle 36 at input 44.

The rear drive axle 36 includes a rear carrier 46, axle housing 48, and a pair of laterally spaced wheel ends 50 positioned on opposing ends of the axle housing 48. The rear carrier 46 includes a carrier housing 52 and rear differential assembly 54 that is operably coupled to drive a pair of axle shafts 56. The axle shafts 56 drive the wheel ends 50, which support tires 58 as discussed above.

Figure 2A:
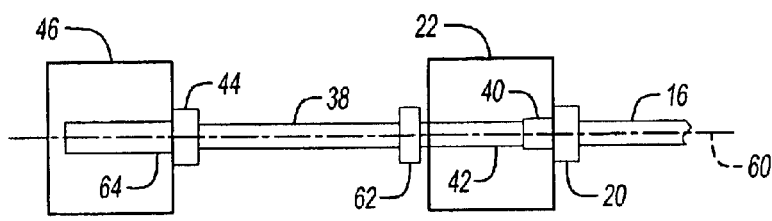
FIG. 2A is a schematic side view of the assembly of FIG. 1.

As shown in FIG. 2A, the input 20 to the forward carrier 22 shares a common axis 60 with the input 44 to the rear carrier 46. As discussed above, the input 20 to the forward carrier 22 is operably coupled to the IAD assembly 40, which is in turn operably coupled to the through shaft 42. The forward drive axle 18 includes an output 62 that is coupled to one end of the connecting driveshaft 38 while the other end of the connecting driveshaft 38 is coupled to the input 44 of the rear carrier 46. The input 44 drives a rear pinion gear 64 of the rear differential assembly 54, which will be discussed in greater detail below.

Figure 2B:
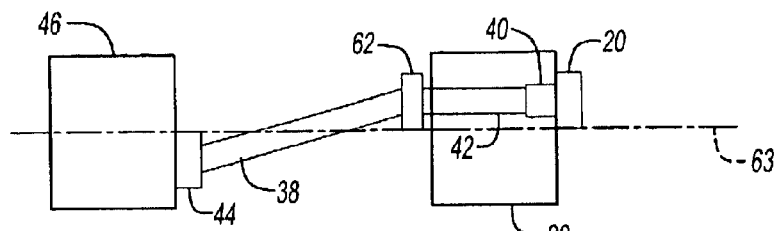
FIG. 2B is an alternate embodiment of the assembly of FIG. 1.

FIG. 2B shows a configuration similar to that of FIG. 2A with the difference being that inputs 20, 44 do not share a common axis. Input 20 is positioned above an axle centerline 63, while input 44 is positioned below the axle centerline 63. While it is not always preferable to have a common axis between the inputs 20, 44, it is preferable to reduce the vertical height between the inputs 20, 44 as much as possible. The subject invention significantly reduces this vertical height difference and can be used in the common axis configuration as well.

Figure 3A:
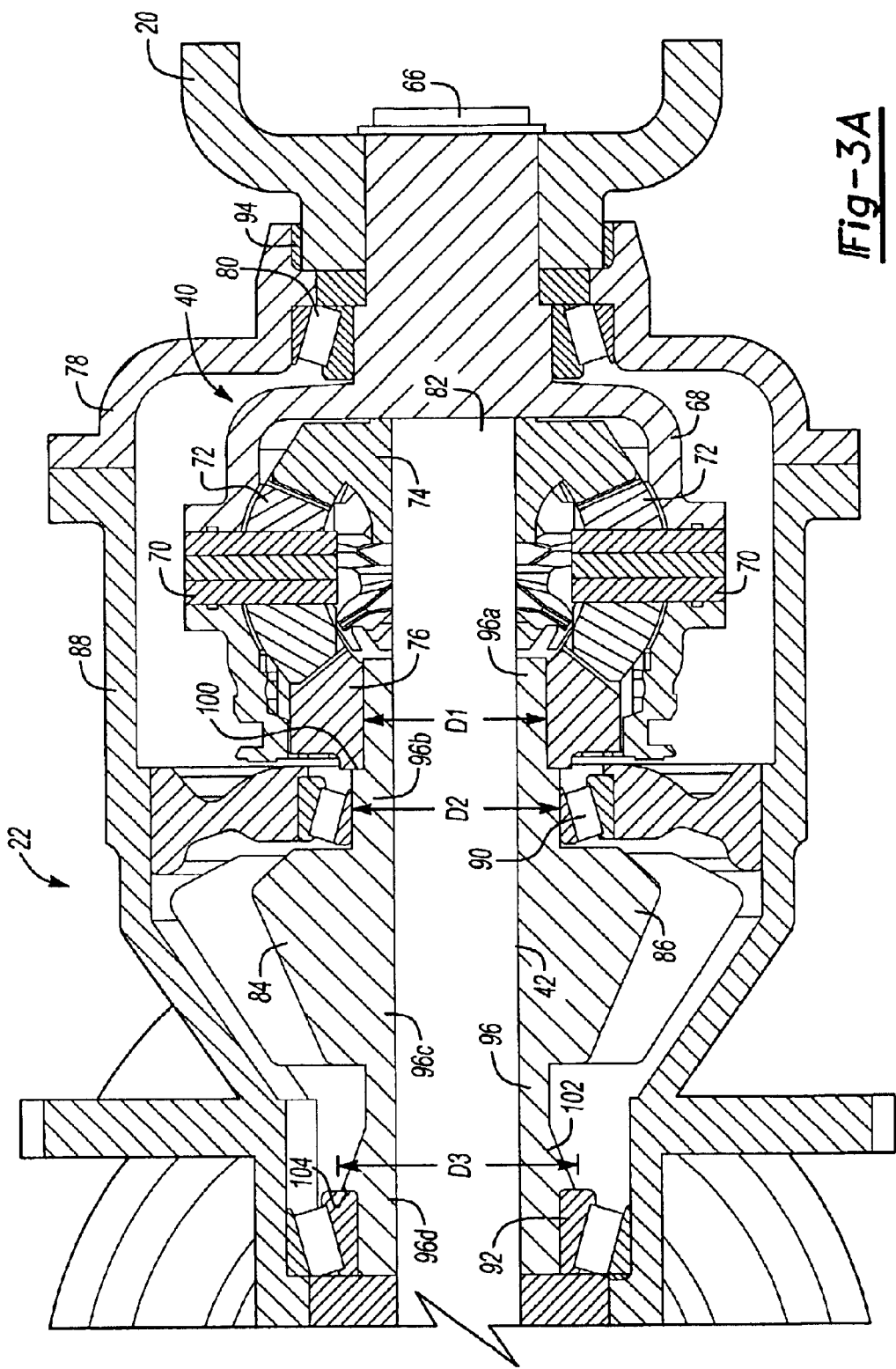
FIG. 3A is a cross-sectional side view of a carrier in the forward drive axle of the tandem set, which incorporates the subject invention.
Figure 3B:
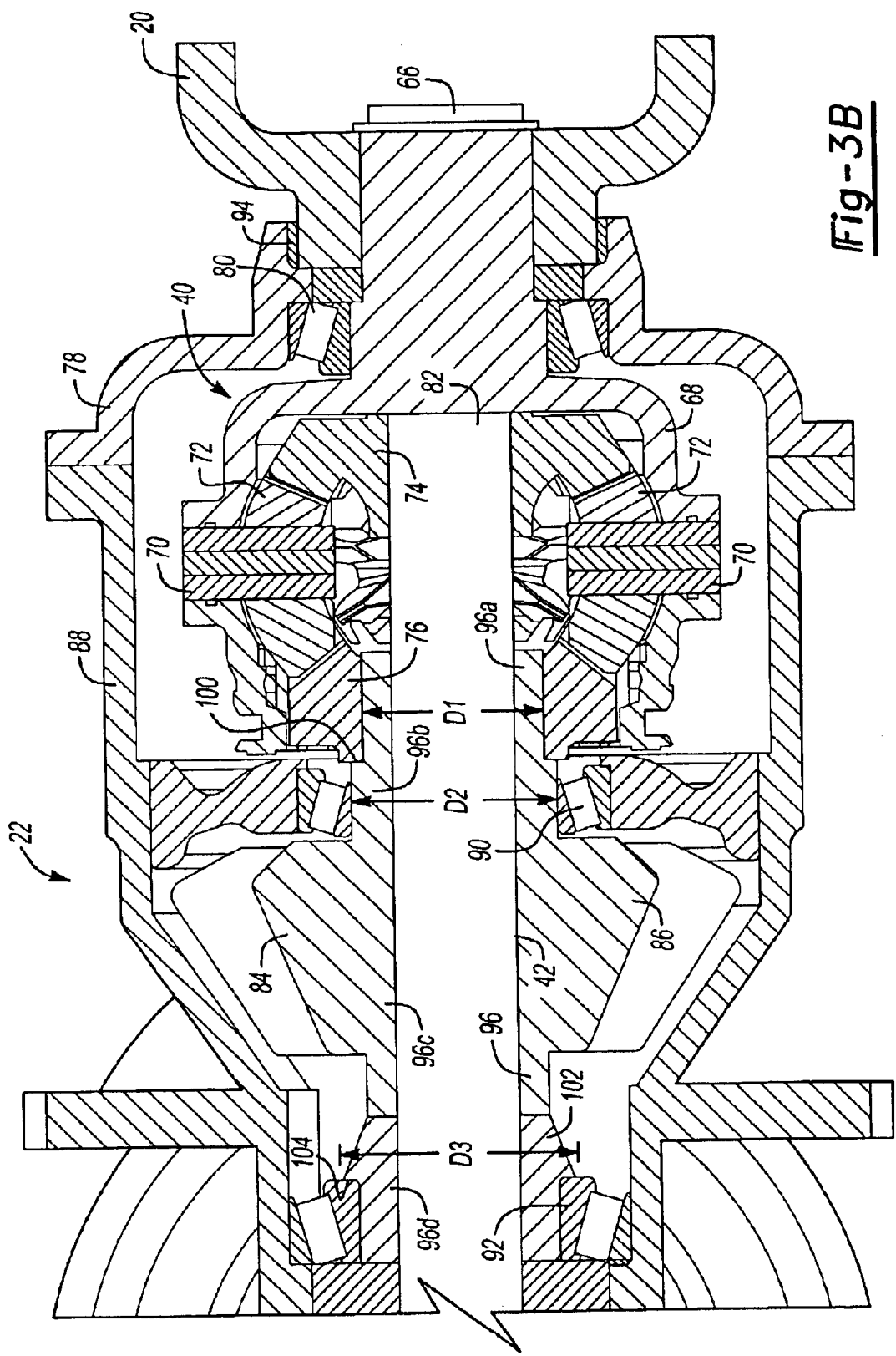
FIG. 3B is an alternate embodiment of the carrier of FIG. 3A.

As shown in FIGS. 3A and 3B, the forward drive axle 18 includes the IAD assembly 40 that is preferably fastened to the input 20 through a fastener 66. Input 20 is preferably a yoke assembly that receives rotational input from driveshaft 16. The IAD assembly 40 includes an IAD housing 68 and an IAD gear assembly, which includes a plurality of spider shafts 70, a plurality of spider gears 72, an outboard side gear 74, and an inboard side gear 76. IAD assembly 40 is supported within an IAD cover 78 by a single tapered roller bearing 80. The outboard 74 and inboard 76 side gears are substantially enclosed within the IAD housing 68. The bearing 80 directly engages the IAD housing 68 at a position outboard from the outboard side gear 74. Bearing 80 is directly supported between the IAD cover 78 and the IAD housing 68.

Rotation of drive shaft 26 is transferred to IAD assembly 40 through input 20. IAD assembly 40 in turn rotates the spider shafts 70 that rotate the spider gears 72. Spider gears 72 rotate the outboard and inboard side gears 74, 76. The operation of the IAD gear assembly is well known in the art and will not be discussed in detail.

Through shaft 42 includes a first end 82 that is secured to the outboard side gear 74. Through shaft 42 extends from the outboard side gear 74 through a hollow pinion gear 84. Hollow pinion gear 84 includes a pinion gear head 86 and is rotated by the inboard side gear 76. Through shaft 42 is not fixed to rotate with inboard side gear 76 and outboard side gear 74, however, through shaft 42 and side gears 74, 76 do tend to all rotate at the same speed. Outboard and inboard side 74, 76 are fixed to rotate together. A pair of tapered roller bearings support hollow pinion gear 84 within a main differential cover 88 that is preferably mounted to an axle component such as the axle housing 24. Hollow pinion gear 84 drives the forward differential assembly 30. The operation and structure of the forward differential assembly 30 is well known in the art and does not form a novel portion of the present invention.

The pair of tapered roller bearings includes a first bearing 90 that is supported directly between the main differential cover 88 on an outboard end of the hollow pinion gear 84 and a second bearing 92 that is supported directly between the main differential cover 88 and an inboard end of the hollow pinion gear 84. Both the first 90 and second 92 bearings are positioned inboard from the IAD assembly 40.

Through shaft 42 extends outwardly from forward drive axle 18 and passes closely adjacent either above or below axle shafts 32. A seal 94 is utilized to seal one end of IAD cover 78 to input 20. As shown in FIG. 2, through shaft 42 and hollow pinion gear 84 are on the same axis 60 as the input 20 to through shaft 42 from IAD assembly 40 and the output 62 from the forward drive axle 18.

The hollow pinion gear 84 comprises a hollow pinion shaft 96 that is integrally formed as one piece with the pinion gear head 86. The through shaft 42 extends through the hollow pinion shaft 96. The first bearing 90 is positioned on an outboard side of the pinion gear head 86 and the second bearing 92 is positioned on an inboard side of the pinion gear head 86.

The hollow pinion shaft 96 includes a first portion 96a received within the outboard side gear 74, a second portion 96b for supporting the first bearing 90, a third portion 96c forming the pinion gear head 86, and a fourth portion 96d extending inboard from the pinion gear head 86 for supporting the second bearing 92. The first portion 96a is defined by a first diameter D1 and the second portion 96b is defined by a second diameter D2 greater than the first diameter to define thrust surface 100 for reaction with the inboard side gear 76. Optionally, thrust surface 100 could be replaced by a face or end of bearing 90. The fourth portion 96d includes a radially extending flange 102 defined by a third diameter D3 greater than said first diameter D1 to define a reaction surface 104 engaged by the second bearing 92. Thus, thrust loading on the inboard side of the IAD gear assembly is reacted by at least one of the tapered roller bearings 90, 92 that support the hollow pinion gear 84. This permits elimination of one of the bearings traditionally needed to support the IAD assembly 40.

In one embodiment, shown in FIG. 3A, the first 96a, second 96b, third 96c, and fourth 96d portions are all integrally formed as a single piece. In an alternate embodiment, shown in FIG. 3B, the first 96a, second 96b, and third 96c portions are integrally formed as a single piece. The fourth portion 96d is friction, projection, or otherwise similarly welded to the third portion 96c end of the hollow pinion shaft 96.

Figure 4:
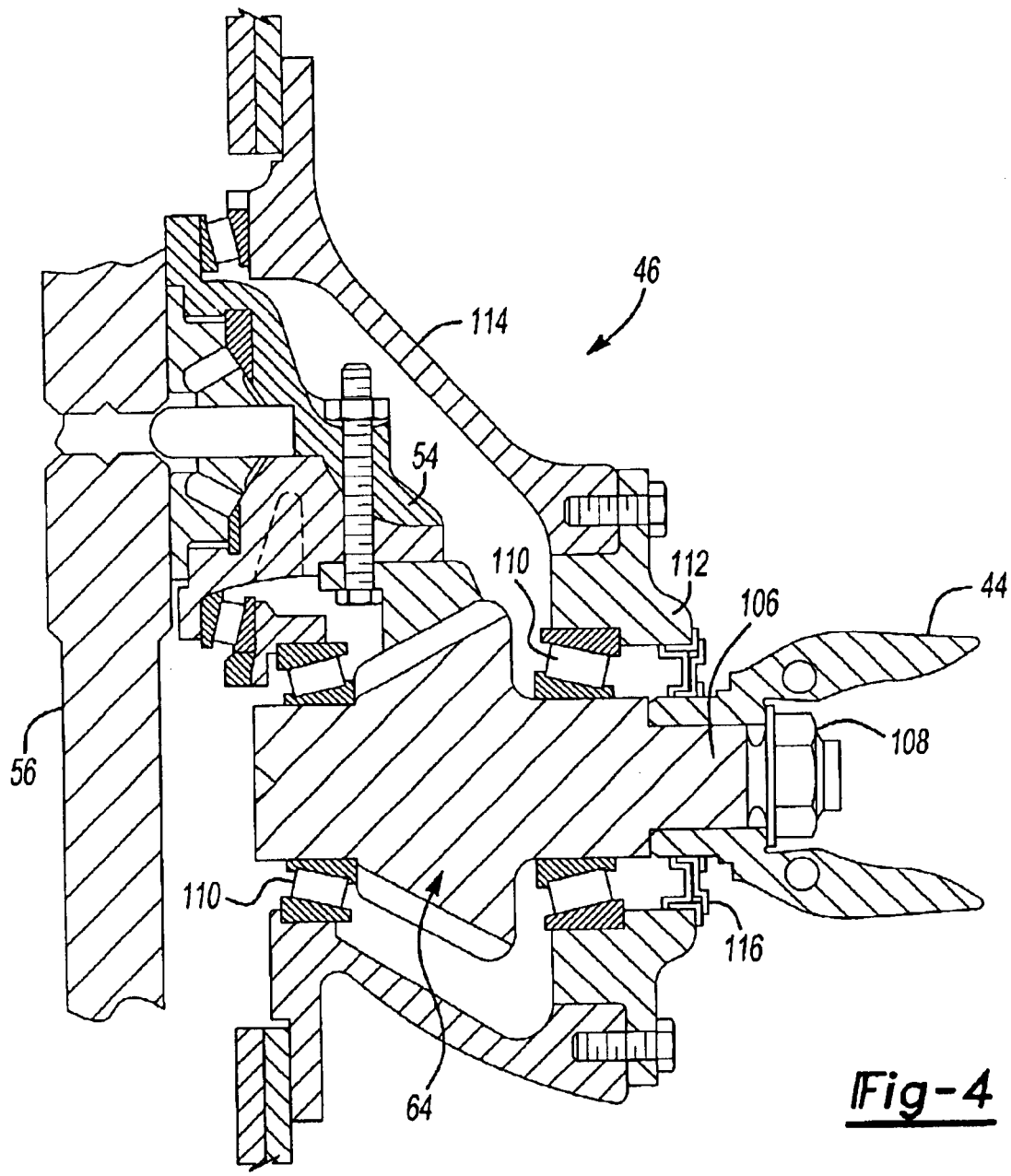
FIG. 4 is a cross-sectional top view of a carrier in the rear drive axle of the tandem set.

In FIG. 4, a cross-sectional top view of the rear carrier 46 of the rear drive axle 36 is shown. A rear pinion gear 64 has an input end 106 that is preferably secured via a fastener 108 to input 44. Input 44 receives rotational input from connecting driveshaft 38. As mentioned above, input end 106 is on the same axis 60 as through shaft 42. In one embodiment, a plurality of roller bearings 110 and a pinion cage 112 support rear pinion gear 64 within a rear differential cover 114. Preferably, roller bearings 110 are tapered roller bearings as shown. Rotation of rear pinion gear 64 drives a rear differential assembly 54. The design of rear differential assembly 54 is well known in the art. The rear differential assembly 54 drives the rear drive axle shafts 56. A seal 116 seals a gap between pinion cage 112 and input 44. Preferably, seal 116 and seal 94 comprise annular seals as are known in the art.

As shown in FIGS. 1–4, the present design permits a common axis 60 to be shared by IAD assembly 40, through shaft 42, hollow pinion gear 84, and rear pinion gear 64 or optionally, significantly reduces the vertical height between the inputs 20, 44. Thus, the present design reduces the issues related to adjustment of driveline angles between yokes on the ends of any of the inputs or outputs to the tandem drive axle set. In addition, the present design enables the elimination of the traditional helical gear set in the forward drive axle 18. Further, an overall reduction in the number of bearings required within the subject axle configuration provides the benefits of a more compact and lightweight axle assembly or in the alternative increases the packaging space available for other axle components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A tandem drive axle set including a forward drive axle and a rear drive axle comprising:

a forward drive assembly including a main differential having a forward pinion gear rotatably supported by a first bearing set and receiving input from an inter-axle differential, said inter-axle differential being rotatably supported by a second bearing set and having a first side gear and a second side gear;

a through shaft having a first end secured to said first side gear and a second end extending past said forward drive assembly, said through shaft rotating with said first side gear;

a rear drive assembly including a rear pinion gear and a rear differential, said through shaft driving said rear pinion gear;

said second side gear in driving engagement with said forward pinion gear with rotation of said inter-axle differential resulting in rotation of said through shaft and said main differential via said forward pinion gear;

wherein thrust loading of said second side gear is reacted by said first bearing set with said forward pinion gear including a thrust surface for reacting against said second side gear; and wherein said inter-axle differential, said through shaft, and said forward pinion gear are coaxial.

2. The tandem drive axle set as recited in claim 1 wherein said second bearing set comprises a single bearing.

3. The tandem drive axle set as recited in claim 2 wherein said inter-axle differential includes an inter-axle differential gear assembly including said first and second side gears that are substantially enclosed within an inter-axle differential housing and wherein said second bearing set directly engages said inter-axle differential housing at a position outboard from said inter-axle differential gear assembly.

4. The tandem drive axle set as recited in claim 3 including an inter-axle differential cover mountable to an axle housing component for substantially enclosing said inter-axle differential within the forward drive axle, said second bearing set being directly supported between said inter-axle differential housing and said inter-axle differential cover.

5. The tandem drive axle set as recited in claim 1 wherein said forward pinion gear comprises a hollow pinion shaft with a pinion gear head, said through shaft extending through said hollow pinion shaft.

6. The tandem drive axle set as recited in claim 5 wherein said first bearing set consists of a first bearing positioned on an inboard side of said pinion gear head and a second bearing positioned on an outboard side of said pinion gear head.

7. The tandem drive axle set as recited in claim 6 wherein said first and second bearings are both positioned inboard from said inter-axle differential.

8. The tandem drive axle set as recited in claim 7 wherein said first bearing set comprises a single tapered roller bearing and said first and second bearings of said second bearing set are each single tapered roller bearings.

9. The tandem drive axle set as recited in claim 7 wherein said thrust loading of said second side gear is reacted by said second bearing positioned on said outboard side of said pinion gear head.

10. The tandem drive axle set as recited in claim 1 wherein said forward pinion gear includes a pinion shaft with a pinion gear head, said pinion shaft having an inboard end and an outboard end with an increased diameter portion between said inboard and outboard ends forming said thrust surface.

11. The tandem drive axle set as recited in claim 10 wherein said first bearing set includes a first bearing positioned on an inboard side of said pinion gear head and a second bearing positioned on an outboard side of said pinion gear head with said second bearing being seated on said increased diameter portion.

12. A tandem drive axle set including a forward drive axle and a rear drive axle comprising:

a forward drive assembly including a main differential having a forward pinion gear rotatably supported by a first bearing set and receiving input from an inter-axle differential, said forward pinion gear comprising a hollow pinion shaft with a pinion gear head, said inter-axle differential being rotatably supported by a second bearing set and having a first side gear and a second side gear wherein thrust loading of said second side gear is reacted by said first bearing set;

said first bearing set consisting of a first bearing positioned on an inboard side of said pinion gear head and a second bearing positioned on an outboard side of said pinion gear head with said first and second bearings both being positioned inboard from said inter-axle differential wherein said thrust loading of said second side gear is reacted by said second bearing positioned on said outboard side of said pinion gear head;

said hollow pinion shaft including a first portion received within said second side gear and defined by a first diameter, a second portion for supporting said second bearing and defined by a second diameter greater than said first diameter to define a thrust surface for reaction with said second side gear, a third portion forming said pinion gear head, and a fourth portion extending inboard from said pinion gear head for supporting said first bearing;

a through shaft having a first end secured to said first side gear and a second end extending past said forward drive assembly, said through shaft rotating with said first side gear and extending through said hollow pinion shaft;

a rear drive assembly including a rear pinion gear and a rear differential, said through shaft driving said rear pinion gear;

said second side gear in driving engagement with said forward pinion gear with rotation of said inter-axle differential resulting in rotation of said through shaft and said main differential via said forward pinion gear; and wherein said inter-axle differential, said through shaft, and said forward pinion gear are coaxial.

13. The tandem drive axle set as recited in claim 12 wherein said fourth portion includes a radially extending flange defined by a third diameter greater than said first diameter to define a reaction surface engageable by said first bearing.

14. The tandem drive axle set as recited in claim 13 including a main differential cover mountable to an axle housing component to substantially enclose said main differential within the forward drive axle wherein said first and second bearings are directly supported between said main differential cover and said hollow pinion shaft.

15. The tandem drive axle set as recited in claim 12 wherein said first, second, third and fourth portions are integrally formed as a single piece.

16. The tandem drive axle set as recited in claim 12 wherein said first, second and third portions are integrally formed as a single piece and wherein said fourth portion is welded to said third portion to define a weld interface.

17. A tandem drive axle set comprising:

a forward drive assembly including an inter-axle differential having an outboard side gear and an inboard side gear, a main differential receiving driving input from said inter-axle differential and including a hollow pinion gear supported by a first bearing set, said inter-axle differential being rotatably supported solely by a single tapered roller bearing wherein thrust loading of said inboard side gear is reacted by said first bearing set with said hollow pinion gear including a thrust surface for reacting against said inboard side gear;

a through shaft having a first end secured to said outboard side gear and extending through said hollow pinion gear such that said through shaft and said hollow pinion gear are capable of independent relative rotation;

a rear drive assembly including a rear pinion gear and a rear differential, said through shaft driving said rear pinion gear; and wherein rotation of said inter-axle differential on said single tapered roller bearing results in rotation of said through shaft, said hollow pinion gear, and said rear pinion gear, with said hollow pinion gear driving said main differential and said rear pinion gear driving said rear differential.

18. The tandem drive axle set as recited in claim 17 wherein said first bearing set consists of a pair of tapered roller bearings.

19. The tandem drive axle set as recited in claim 18 wherein said hollow pinion gear comprises a hollow pinion shaft integrally formed with a pinion gear head as a single piece wherein a first bearing of said pair of tapered roller bearings is directly supported on an inboard side of said pinion gear head and wherein a second bearing of said pair of tapered roller bearings is directly supported on an outboard side of said pinion gear head.

20. The tandem axle drive set as recited in claim 19 wherein thrust loading of said inter-axle differential is reacted by said second bearing.

21. The tandem drive axle set as recited in claim 17 wherein said hollow pinion gear includes a pinion shaft with a pinion gear head, said pinion shaft having an inboard end and an outboard end with an increased diameter portion between said inboard and outboard ends forming said thrust surface.

22. The tandem drive axle set as recited in claim 21 wherein said first bearing set includes a first bearing positioned on an inboard side of said pinion gear head and a second bearing positioned on an outboard side of said pinion gear head with said second bearing being seated on said increased diameter portion and with an end of said inboard side gear being in direct abutting engagement with said thrust surface.

23. A tandem drive axle set comprising:

a forward drive assembly including an inter-axle differential having an outboard side gear and an inboard side gear, a main differential receiving driving input from said inter-axle differential and including a hollow pinion gear solely supported by a pair of tapered roller bearings, said inter-axle differential being rotatably supported solely by a single tapered roller bearing;

said hollow pinion gear comprising a hollow pinion shaft integrally formed with a pinion gear head as a single piece wherein a first bearing of said pair of tapered roller bearings is directly supported on an inboard side of said pinion gear head and wherein a second bearing of said pair of tapered roller bearings is directly supported on an outboard side of said pinion gear head wherein thrust loading of said inter-axle differential is reacted by said second bearing;

said hollow pinion shaft including a first portion received within said inboard side gear and defined by a first diameter, a second portion for supporting said second bearing and defined by a second diameter greater than said first diameter to define a thrust surface for reaction with said inboard side gear, a third portion forming said pinion gear head, and a fourth portion extending inboard from said pinion gear head for supporting said first bearing;

a through shaft having a first end secured to said outboard side gear and extending through said hollow pinion gear such that said through shaft and said hollow pinion gear are capable of independent relative rotation;

a rear drive assembly including a rear pinion gear and a rear differential, said through shaft driving said rear pinion gear; and wherein rotation of said inter-axle differential on said single tapered roller bearing results in rotation of said through shaft, said hollow pinion gear, and said rear pinion gear, with said hollow pinion gear driving said main differential and said rear pinion gear driving said rear differential.

24. The tandem drive axle set as recited in claim 23 wherein said inter-axle differential is rotatably supported by said single tapered roller bearing at a position outboard from said outboard side gear.

25. The tandem drive axle set as recited in claim 24 including an inter-axle differential cover enclosing at least a portion of said inter-axle differential within a forward axle of the tandem drive axle set and a main differential cover enclosing at least a portion of the main differential within the forward axle wherein said first and second bearings are supported directly between said main differential cover and said hollow pinion shaft and said single tapered roller bearing supporting said inter-axle differential is supported directly between said inter-axle differential and said inter-axle differential cover.

26. The tandem drive axle set as recited in claim 23 wherein said first, second, third and fourth portions are integrally formed as a single piece.

27. The tandem drive axle set as recited in claim 23 wherein said first, second and third portions are integrally formed as a single piece and wherein said fourth portion is welded to said third portion to define a weld interface.

* * * * *